3,034,960
VAGINAL COMPOSITION CONTAINING 9-AMINO-ACRIDINE UNDECYLENATE AND N-MYRISTYL-3-HYDROXYBUTYLAMINE HYDROCHLORIDE
Albert B. Scott, Seymour, Ind., assignor to The Central Pharmacal Company, Seymour, Ind.
No Drawing. Filed Feb. 24, 1959, Ser. No. 794,837
2 Claims. (Cl. 167—58)

The present invention relates to an improved therapeutic composition and more particularly for the treatment of vaginal infections. In the prior art, many compounds and compositions have been disclosed as treatments for vaginal infections, but it is not believed that a satisfactory composition for treatment has been developed prior to this invention.

It is an object of this invention to provide new compositions which exhibit remarkable effectiveness in combating vaginal infections.

It is another object of this invention to provide a new and highly effective vaginal suppository.

It is a further object of this invention to provide a new and highly effective method for the treatment of vaginal infections.

Other objects and advantages of the invention will become apparent as the description progresses.

The present invention contemplates, in its preferred embodiment, a composition containing as the active ingredients 9-aminoacridine undecylenate, N-myristyl-3-hydroxy-butylamine hydrochloride and methyl benzethonium chloride. More particularly, the composition is mixed with succinic acid and an excipient, such as lactose, starch or gelatine to form a rapidly disintegrating soluble vaginal tablet. A description of the active ingredients is as follows:

9-aminoacridine undecylenate is effective as an antifungal and antibacterial agent, particularly against the anaerobes. It does not affect phagocytosis and its activity is not diminished in the presence of pus or organic matter. The undecylenate salt shows considerably greater antifungal activity than 9-aminoacridine by itself.

N-myristyl-3-hydroxy-butylamine hydrochloride is a non-quaternary topical antibacterial antiseptic. A concentration of 0–1% in phosphate buffer is non-irritating to the rabbit eye after daily instillation of 0.5 ml. for seven days.

Methyl benzethonium chloride is a surfactant and antibacterial quaternary ammonium compound and has broad action against various organisms.

It is believed that a more than expected effect occurs when two of the active ingredients are combined. It is believed that this effect is especially important in order to obtain high levels of potency without irritation. For example, each antibacterial substance per se could not be comfortably used at the same potency level as the whole composition. This is analogous to the triple sulfa combination which lessens the risk of kidney injury. It is also believed that there is an unexpectedly superior destructive and/or inhibitive effect between two or all of the active ingredients when tested against bacteria, trichomonads and monilia.

It is believed that these compositions offer topical action equivalent to the antibiotics, but at lower cost and without the risk of antibiotic sensitization.

The following specific preferred embodiment demonstrates the marked utility of this invention for combating vaginal infections.

| Formula | Parts, mg. | Active Ingredients, Percent by Weight |
|---|---|---|
| Each tablet contains: | | |
| 9-aminoacridine undecylenate | 1 | 26.3 |
| N-myristyl-3-hydroxy-butylamine hydrochloride | 1 | 26.3 |
| methyl benzethonium chloride | 1.8 | 47.4 |
| succinic acid | 12.5 | |

Lactose, starch and gelatine are used as excipients in a rapidly disintegrating soluble vaginal tablet.

*Dosage and administration.*—Various practitioners have their own ideas concerning the treatment, especially the early phases, of vaginitis. Treatment with tablets may be preceded, if the physician desires, with a thorough cleansing of the vaginal tract and perineal area. Following this, some use a wet antiseptic pack for 12 to 24 hours before starting routine medication. Such practices should be optional with the physician.

For routine use, 1 or 2 tablets daily should be placed high in the vaginal vault next to the cervix. This should be continued several weeks and through menstruation. The treatment is then continued through a second cycle. Douching is permitted once weekly. Whether 1 or 2 tablets are used at a time depends upon the severity of the case and should rest with the judgment of the physician.

The simplest acid douche is made by adding 4 tablespoonfuls of white vinegar to 2 quarts of warm water. Some physicians prefer a lactic acid douche. A stock solution may be prepared by adding 60 cc. lactic acid (85%) to 240 cc. of distilled water. One teaspoonful of this solution is added to a full douche bag of warm water. Another douche solution which has been strongly recommended consists of ¼ teaspoonful of iodine tincture U.S.P. per quart of warm water.

Using the aforementioned preferred embodiments of the invention, a test program was conducted for a period of five months with forty-two patients having either *Trichomonas vaginalis* or *Monilial vaginitis* or senile vaginitis. Of the forty-two patients treated, thirty-six had all the vaginal symptoms removed and only one patient, a very early pregnancy, appeared to be relatively unaffected by the treatment. Consequently, the test program showed that the vaginal suppositories based on the present invention, when properly used, form an exceedingly valuable addition to the gynecologist's armamentarium for the treatment of vaginal infections.

The following compositions are also effective in combating vaginal infections.

(1) Active ingredients: Weight percent
9-aminoacridine undecylenate _____ 13
N-myristyl-3-hydroxy-butylamine hydrochloride _____ 39
Methyl benzethonium chloride _____ 48

(2) Active ingredients:
- 9-aminoacridine undecylenate _____ 6.5
- N-myristyl-3-hydroxy-butylamine hydrochloride _____ 45.5
- Methyl benzethonium chloride _____ 48

(3) Active ingredients:
- 9-aminoacridine undecylenate _____ 3.8
- N-myristyl-3-hydroxy-butylamine hydrochloride _____ 48.2
- Methyl benzethonium chloride _____ 48

(4) Active ingredients:
- 9-aminoacridine undecylenate _____ 39
- N-myristyl-3-hydroxy-butylamine hydrochloride _____ 13
- Methyl benzethonium chloride _____ 48

(5) Active ingredients:
- 9-aminoacridine undecylenate _____ 45.5
- N-myristyl-3-hydroxy-butylamine hydrochloride _____ 6.5
- Methyl benzethonium chloride _____ 48

(6) Active ingredients:
- 9-aminoacridine undecylenate _____ 48.2
- N-myristyl-3-hydroxy-butylamine hydrochloride _____ 3.8
- Methyl benzethonium chloride _____ 48

(7) Active ingredients:
- 9-aminoacridine undecylenate _____ 38
- N-myristyl-3-hydroxy-butylamine hydrochloride _____ 38
- Methyl benzethonium chloride _____ 24

(8) Active ingredients:
- 9-aminoacridine undecylenate _____ 44
- N-myristyl-3-hydroxy-butylamine hydrochloride _____ 44
- Methyl benzethonium chloride _____ 12

(9) Active ingredients:
- 9-aminoacridine undecylenate _____ 47
- N-myristyl-3-hydroxy-butylamine hydrochloride _____ 47
- Methyl benzethonium chloride _____ 6

(10) Active ingredients:
- 9-aminoacridine undecylenate _____ 48.5
- N-myristyl-3-hydroxy-butylamine hydrochloride _____ 48.5
- Methyl benzethonium chloride _____ 3

(11) Active ingredients:
- 9-aminoacridine undecylenate _____ 94
- N-myristyl-3-hydroxy-butylamine hydrochloride _____ 3
- Methyl benzethonium chloride _____ 3

(12) Active ingredients:
- 9-aminoacridine undecylenate _____ 3
- N-myristyl-3-hydroxy-butylamine hydrochloride _____ 94
- Methyl benzethonium chloride _____ 3

(13) Active ingredients:
- 9-aminoacridine undecylenate _____ 3
- N-myristyl-3-hydroxy-butylamine hydrochloride _____ 3
- Methyl benzethonium chloride _____ 94

The following examples are without methyl benzethonium chloride.

(14) Active ingredients: Weight percent
- 9-aminoacridine undecylenate _____ 50
- N-myristyl-3-hydroxy-butylamine hydrochloride _____ 50

(15) Active ingredients:
- 9-aminoacridine undecylenate _____ 90
- N-myristyl-3-hydroxy-butylamine hydrochloride _____ 10

The following examples are without N-myristyl-3-hydroxy-butylamine hydrochloride.

(16) Active ingredients: Weight percent
- 9-aminoacridine undecylenate _____ 50
- Methyl benzethonium chloride _____ 50

(17) Active ingredients:
- 9-aminoacridine undecylenate _____ 10
- Methyl benzethonium chloride _____ 90

(18) Active ingredients:
- 9-aminoacridine undecylenate _____ 90
- Methyl benzethonium chloride _____ 10

The following examples are without 9-aminoacridine undecylenate.

(19) Active ingredients: Weight percent
- N-myristyl-3-hydroxy-butylamine hydrochloride _____ 50
- Methyl benzethonium chloride _____ 50

(20) Active ingredients:
- N-myristyl-3-hydroxy-butylamine hydrochloride _____ 10
- Methyl benzethonium chloride _____ 90

(21) Active ingredients:
- N-myristyl-3-hydroxy-butylamine hydrochloride _____ 90
- Methyl benzethonium chloride _____ 10

It is obvious that from the afore-mentioned compositions a wide divergence in proportions can be used to obtain a highly effective theraupectic composition.

In addition to treatment of vaginal infections, the disclosed therapeutic compositions could be used in a topical antiseptic with a local anesthetic, with steroids, for athlete's foot, in lozenges for local action and for many other uses which will occur to one skilled in the art.

It is understood that the inventor intends to claim, as a part of his invention, any variation, substitution and changes that lie within the scope of the invention and the hereinafter appended claims and intends to include within the scope of said claims such changes as may be apparent to those skilled in the art in the practice of the principles of this invention, and within the scope as set forth in the hereinabove-stated specification.

What is claimed is:

1. A germicidal composition for treating Trichomonas infections of the vagina which comprises equal parts of 9-aminoacridine undecylenate and N-myristyl-3-hydroxy-butylamine hydrochloride.

2. The method of treating vaginal infections which comprises contacting the vaginal portion of the body with a composition comprising 9-aminoacridine undecylenate and N-myristyl-3-hydroxy-butylamine hydrochloride.

References Cited in the file of this patent

UNITED STATES PATENTS 2,874,185    Sowa _____ Feb. 19, 1959

OTHER REFERENCES

U.S. Dispensatory, 25th Ed., Lippincott Co., Phil., Pa. (1955), page 2007.

Rogers, American J. Obstetrics and Gynecology, 68:2, August 1954, page 563.

Viscia: J.A.P.A., Sci. Ed., 43:1, January 1954, pages 52–54.